May 8, 1962 F. G. ODDO ET AL 3,032,950
APPARATUS AND PROCESS FOR PRODUCING CAPSULES
Filed April 16, 1959 12 Sheets-Sheet 1

INVENTORS
FRANK G. ODDO
JOHN J. MISKEL

Connolly and Hutz
ATTORNEYS

May 8, 1962 F. G. ODDO ETAL 3,032,950
APPARATUS AND PROCESS FOR PRODUCING CAPSULES
Filed April 16, 1959 12 Sheets-Sheet 4

INVENTORS
FRANK G. ODDO
JOHN J. MISKEL
BY Connolly and Hutz
ATTORNEYS

May 8, 1962 F. G. ODDO ETAL 3,032,950
APPARATUS AND PROCESS FOR PRODUCING CAPSULES
Filed April 16, 1959 12 Sheets-Sheet 5

INVENTORS
FRANK G. ODDO
JOHN J. MISKEL
BY Connolly and Hutz
ATTORNEYS

May 8, 1962 F. G. ODDO ETAL 3,032,950
APPARATUS AND PROCESS FOR PRODUCING CAPSULES
Filed April 16, 1959 12 Sheets-Sheet 6

INVENTORS
FRANK G ODDO
JOHN J. MISKEL

BY Connolly and Hutz
ATTORNEYS

May 8, 1962 F. G. ODDO ETAL 3,032,950

APPARATUS AND PROCESS FOR PRODUCING CAPSULES

Filed April 16, 1959 12 Sheets-Sheet 7

INVENTORS
FRANK G. ODDO
JOHN J. MISKEL

BY Connolly and Hutz

ATTORNEYS

May 8, 1962 F. G. ODDO ETAL 3,032,950
APPARATUS AND PROCESS FOR PRODUCING CAPSULES
Filed April 16, 1959 12 Sheets-Sheet 8
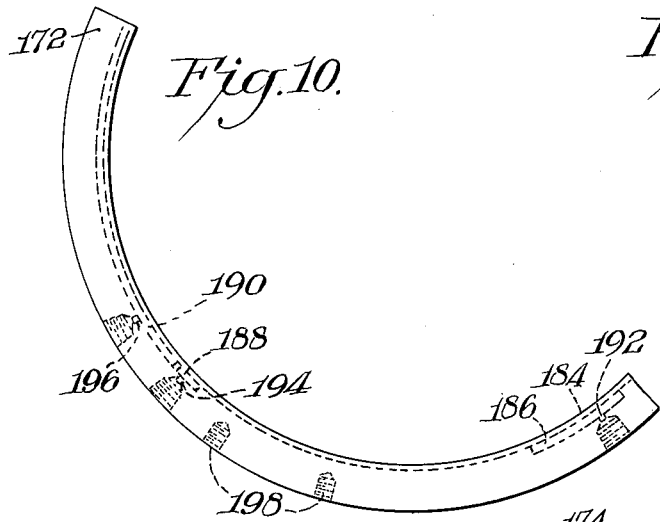
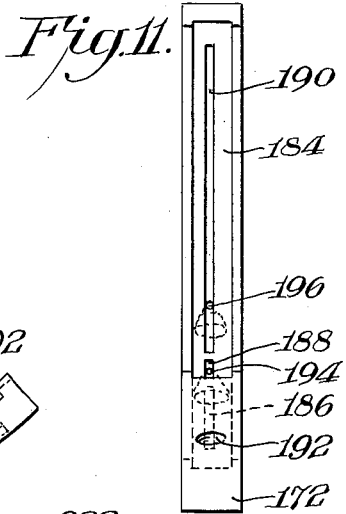
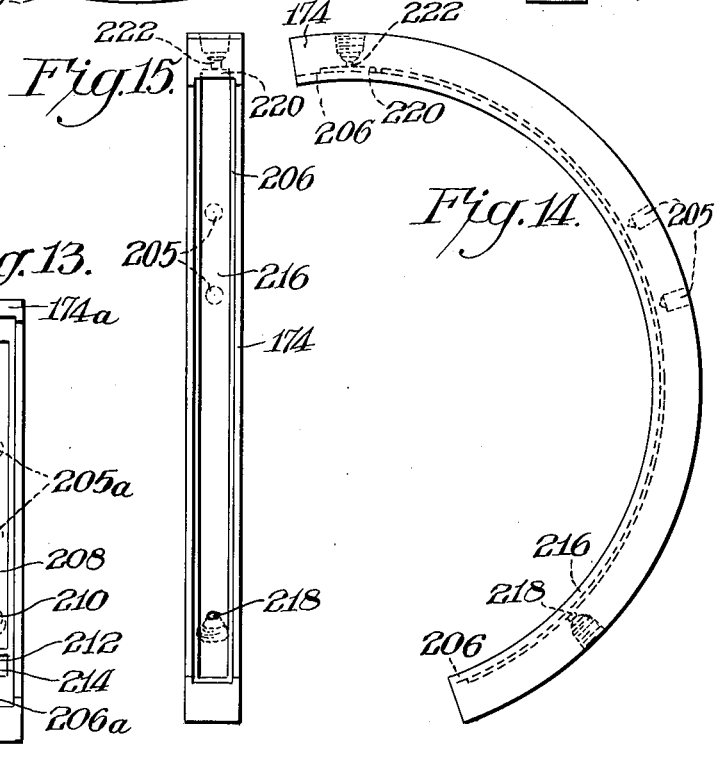
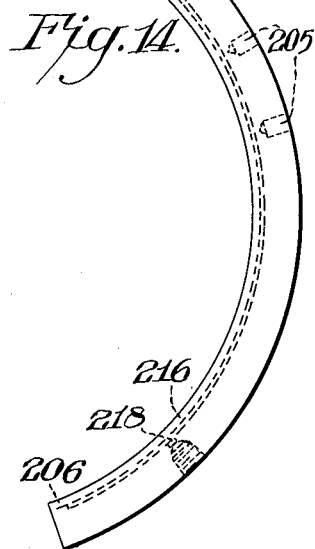
INVENTORS
FRANK G. ODDO
JOHN J. MISKEL
BY Connolly and Hutz
ATTORNEYS May 8, 1962 F. G. ODDO ETAL 3,032,950
APPARATUS AND PROCESS FOR PRODUCING CAPSULES
Filed April 16, 1959 12 Sheets-Sheet 9
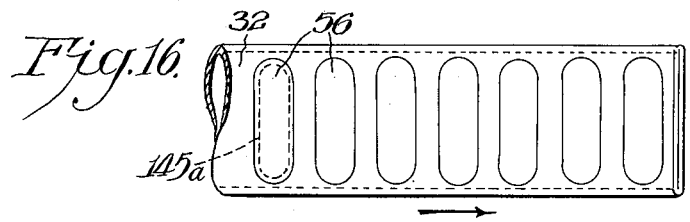
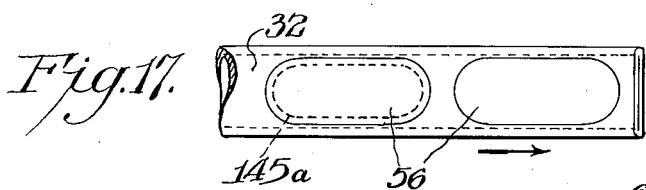
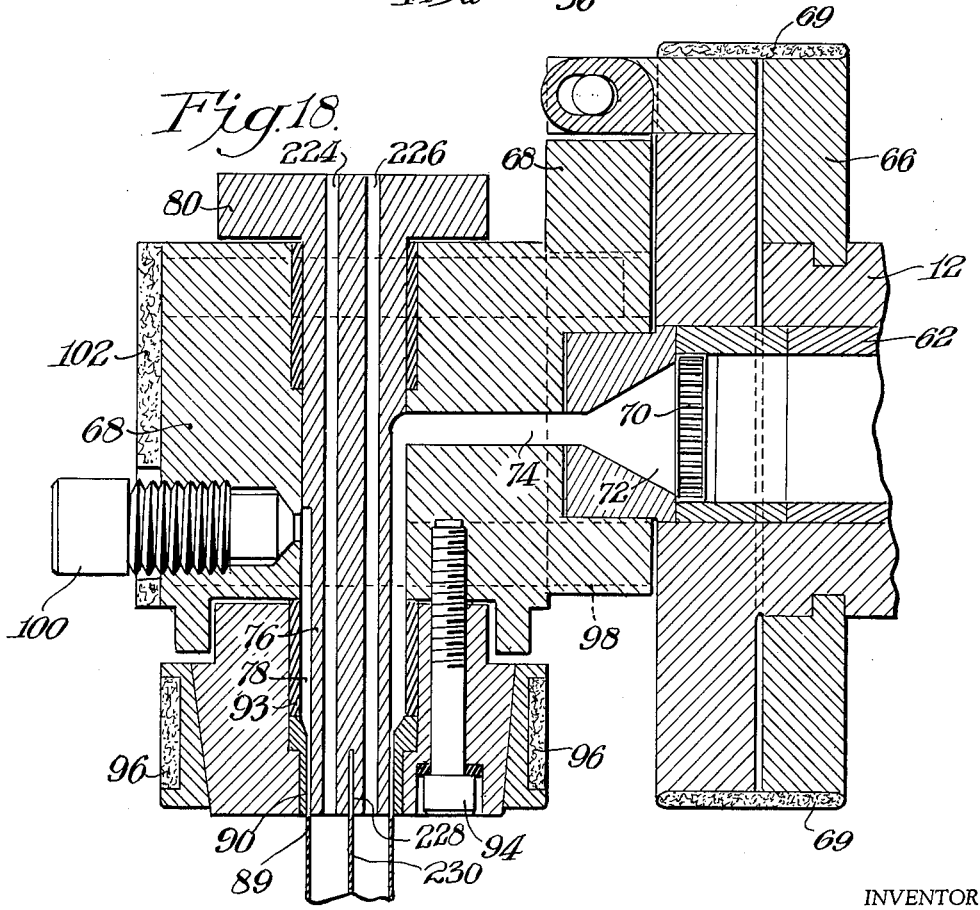
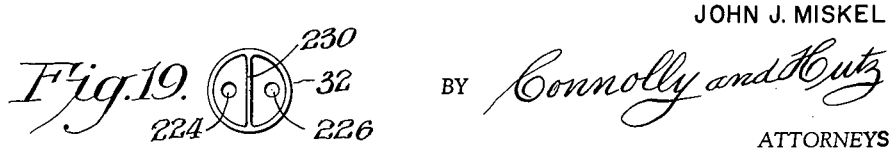
INVENTORS
FRANK G. ODDO
JOHN J. MISKEL
BY Connolly and Hutz
ATTORNEYS

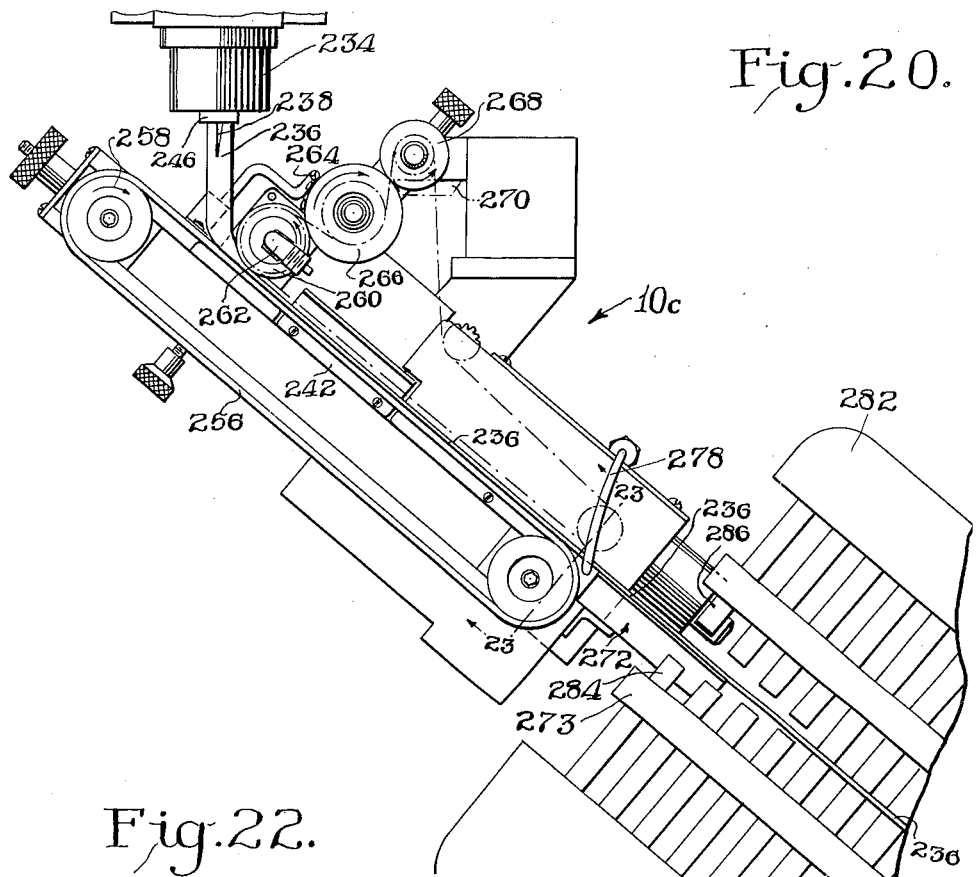
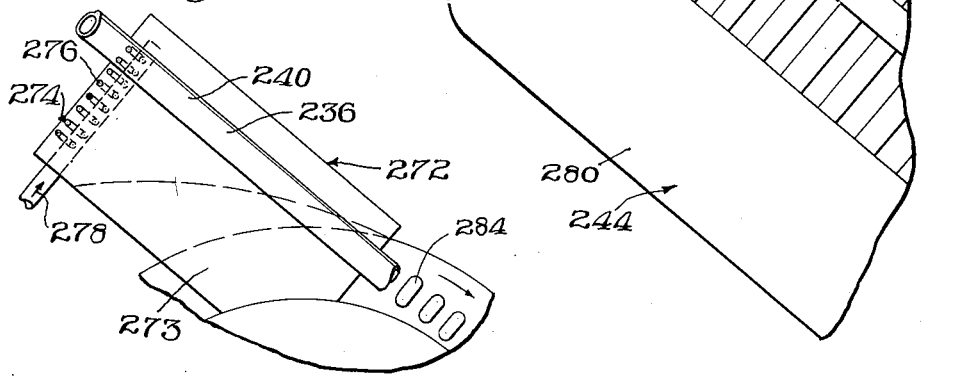

May 8, 1962 F. G. ODDO ETAL 3,032,950
APPARATUS AND PROCESS FOR PRODUCING CAPSULES
Filed April 16, 1959 12 Sheets-Sheet 11
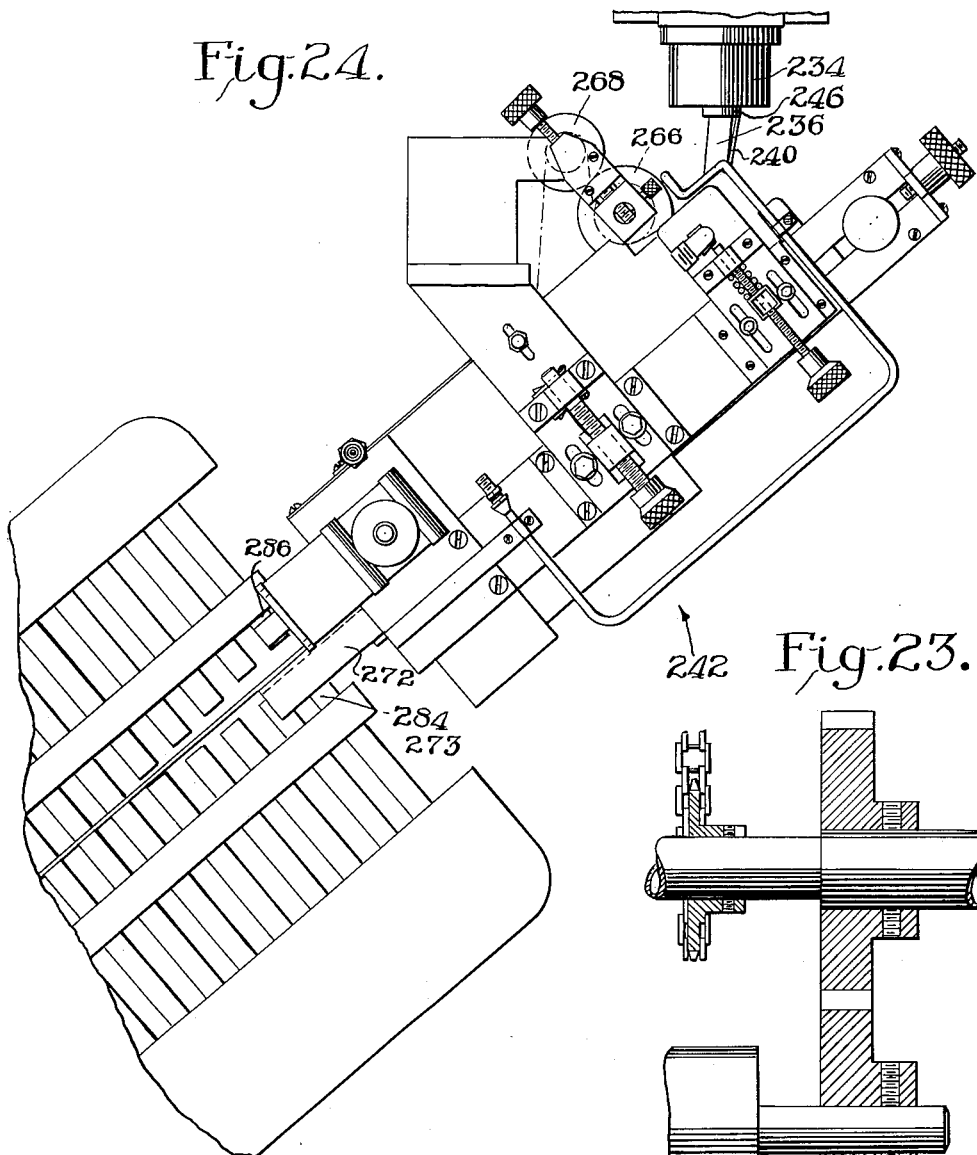
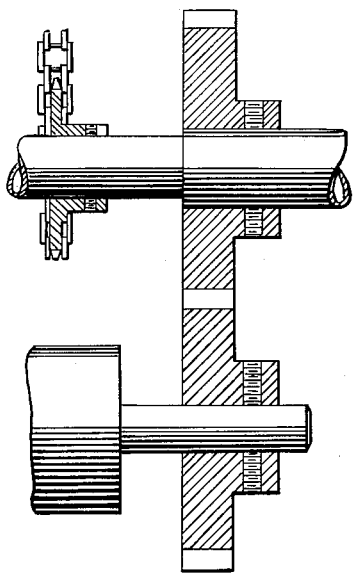
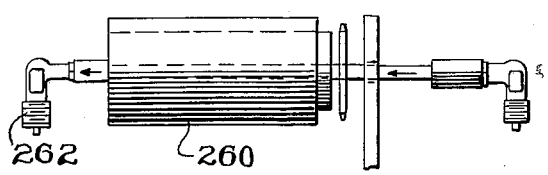
INVENTORS
FRANK G. ODDO
JOHN J. MISKEL
BY Connolly and Hutz
ATTORNEYS May 8, 1962 F. G. ODDO ET AL 3,032,950
APPARATUS AND PROCESS FOR PRODUCING CAPSULES
Filed April 16, 1959 12 Sheets-Sheet 12
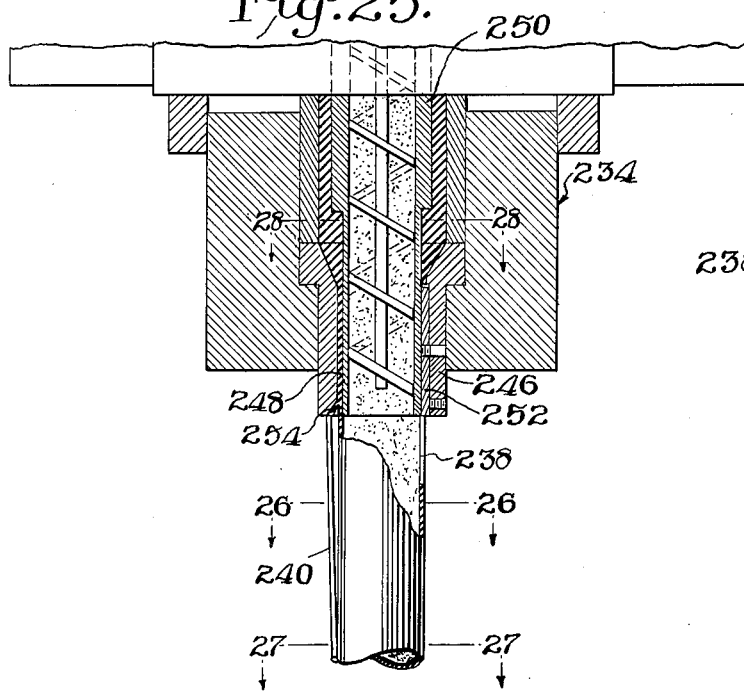
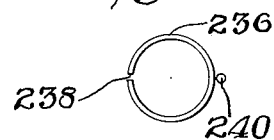
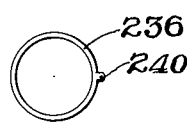
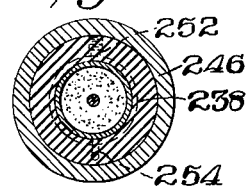
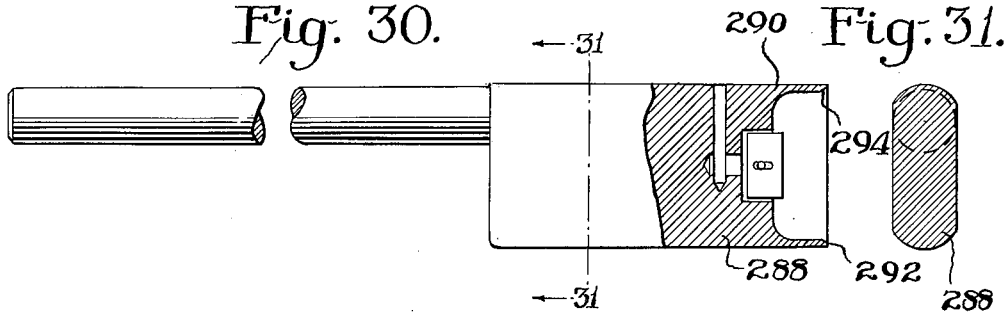
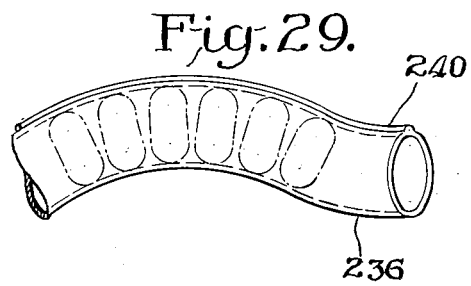
INVENTORS
FRANK G. ODDO
JOHN J. MISKEL
BY Connolly and Hutz
ATTORNEYS

United States Patent Office

3,032,950
Patented May 8, 1962

3,032,950
APPARATUS AND PROCESS FOR
PRODUCING CAPSULES
Frank G. Oddo, Midland Park, N.J., and John J. Miskel,
Brooklyn, N.Y., assignors to Chas. Pfizer & Co., Inc.,
New York, N.Y., a corporation of Delaware
Filed Apr. 16, 1959, Ser. No. 806,973
16 Claims. (Cl. 53—140)

This application is a continuation-in-part of our co-pending application for "Apparatus for Producing Capsules," filed June 27, 1958, and bearing Serial No. 745,-190. This invention relates to an apparatus for producing capsules, and more particularly, to high speed encapsulation through novel means which form, fill and deliver uniform, finished capsules on a fully automatic basis.

The art of encapsulation has been known for many years, particularly for the production of unit dosage forms containing various pharmaceutical products. Normally, such pharmaceutical capsules are composed of gelatin or some modification thereof, which is fabricated essentially into two different forms, namely, the so-called hard gelatin capsule and the soft gelatin capsule.

The hard gelatin, or slip tube capsule is generally formed by dip molding, i.e., a set of fingers are passed through a molten bath of gelatin and withdrawn to permit hardening of the gelatin about the fingers. The tubes thus formed are then trimmed and employed for the encapsulation of various medicaments. However, such capsules have a number of disadvantages. Due to the low glycerine content necessary in forming the capsule, the resulting product is somewhat brittle and tends to crack or break during packaging and shipping operations. In addition, capsules frequently work apart during shipment, resulting in losses of material, and, unless the capsule is sealed at the seam, they are easily susceptible to pilfering.

The soft gelatin capsule overcomes many of these disadvantages, and moreover, it may be produced at considerably less expense. Soft gelatin capsules are ordinarily formed by preparing a melt of gelatin, casting or extruding the melt into sheets of gelatin, and passing such sheets through an encapsulation machine which forms pockets therein, shaped to the desired configuration of the capsule. These pockets are then filled with medicament and sealed with another sheet of gelatin, which is bonded to the first sheet by means of heat and pressures while the capsules are simultaneously cut from the bonded sheets. Although such capsules are generally formed on an automatic or semi-automatic basis, the speed of capsule formation is necessarily limited by the type of machine and method employed. Speeds above 300 to 450 capsules per minute are rarely attained under normal conditions of operation.

Conventional methods also require the preliminary blending of gelatin, which already contains about 10% equilibrium moisture, with a substantial proportion of additional water ranging, for example, from 40 to 50% by weight of the gelatin, melting the resulting mixture by heating for at least four hours at about 180° F. and retaining the hot melt at an elevated temperature, usually about 120° F., for as long as eight hours while the material is formed into the sheets from which the capsules are produced. Under such conditions, the gelatin, due to being held at an elevated temperature over an extended period of time, tends to break down, so that the capsules formed toward the end of the run are generally of poorer quality than those formed at the outset. In addition, the resulting capsules contain considerably more than the equilibrium moisture, which necessitates a subsequent drying operation before the capsules can be packaged and shipped. Obviously this severely limits the scope of conventional soft gelatin encapsulation, since the high water content makes it extremely difficult to package hygroscopic powders. Furthermore, the necessity to keep substantial quantities of molten gelatin on hand is troublesome as well as wasteful because delays in other portions of the production process sometimes cause appreciable quantities of this molten gelatin mixture to spoil before it can be used, or delays in processing this mixture sometimes hold up subsequent processing stages.

Conventional methods of soft gelatin encapsulation also have limitations with respect to the type of fill that must be employed therewith. Ordinarily, it is difficult to fill with a solid, and it has previously been impossible to successfully employ 100% dry fill. Powdered medicaments must ordinarily be wet with a paste-forming substance, such as a vegetable or mineral oil, which increases the size of the capsule and may interfere with absorption of the medicament by the body.

Some attempts have been made to manufacture encapsulating tubing by the extrusion of plastic materials such as by the type of apparatus described in U.S. Letters Patent 2,449,139, which makes some mention of gelatin. However, the methods therein described, and reasonable modifications thereof, could not be successfully applied to the production of gelatin capsules containing heat-sensitive pharmaceuticals, and particularly such capsules filled with powders.

Accordingly, it is an object of this invention to provide an apparatus for encapsulating materials in gelatin without subjection of the gelatin or encapsulated material to destructive conditions of temperature or processing time.

Another object is to provide such an apparatus which permits processing at low moisture levels, thereby avoiding adverse effects upon hygroscopic fill materials and eliminating the necessity for prolonged drying of finished capsules.

A further object is to provide such an apparatus which may be used in encapsulating dry powders as well as liquids or pastes.

Still another object is to provide such an apparatus which produces finished capsules at extremely high speeds.

A further object is to provide such an apparatus which avoids the necessity for preparing and storing quantities of molten gelatin prior to use.

In accordance with this invention, a mixture of gelatin, a plasticizer and from about 4 to 25% of water by weight of the gelatin are homogenized under a pressure of at least about 350 p.s.i. and at temperatures ranging from 140 to 260° F., and extruded to form a continuous tube in a plastic state. Utilization of the plasticizer and this relatively high range of extrusion pressures for gelatin permits a uniform gelatin tube to be extruded from a relatively dry gelatin mixture without utilizing damaging high temperatures. This tube is filled as it is being formed, for example, through an aperture in the center of the extrusion nozzle and then successive lengths of the tube are laterally compressed from opposite sides to separate the tube into a series of filled capsules.

When the tube is filled with relatively dry powders which have a tendency to clog and entrap air, it is uniquely formed with a narrow slit which automatically closes after air is expelled by compressing the tube prior to division into separate capsules. Furthermore, a sloped intermediate conveyor between the tube-forming and capsule-separating stages, in conjunction with a compression roller, prevents the filled tube from sagging and helps control the shaping and filling operations. Still further, novel features of the capsule-separating process and apparatus facilitate formation and dropping of completed capsules having a remarkably clean exterior.

Novel features and advantages of the present invention will become apparent to one skilled in the art from a reading of the following description in conjunction with the accompanying drawings wherein similar reference characters refer to similar parts and in which:

FIG. 8 is a view in elevation, partly in section, of a capsule-forming punch employed in FIG. 4;

FIG. 9 is an end view of the capsule-forming punch of FIG. 8;

FIG. 10 is a more detailed view in elevation of an air and vacuum shoe of FIGS. 4 and 5;

FIG. 11 is an end view of the shoe of FIG. 10;

FIG. 12 is a more detailed view of one of the air and vacuum shoes of FIG. 6;

FIG. 13 is an end view of the shoe of FIG. 12;

FIG. 14 is a more detailed view of the other shoe of FIG. 6;

FIG. 15 is an end view of the shoe of FIG. 14;

FIG. 16 illustrates a length of tubing showing a preferred method for cutting capsules therefrom;

FIG. 17 illustrates another method cutting capsules from said tubing;

FIG. 18 is a view of a modified extrusion die of producing a compartmentalized capsule;

FIG. 19 is a bottom view of the die of FIG. 18;

FIG. 20 is a side view in elevation of an intermediate portion of a modification of the apparatus shown in FIG. 1;

FIG. 21 is a view in elevation of a portion of the modification shown in FIG. 20;

FIG. 22 is a top plan view of another portion of the modification shown in FIG. 20;

FIG. 23 is a cross-sectional view taken through FIG. 20 along the line 23—23;

FIG. 24 is a rear side view in elevation of the intermediate portion shown in FIG. 20;

FIG. 25 is a front view in elevation, partially broken away in cross-section, of a modification of the extrusion nozzle of the embodiment shown in FIG. 1;

Figure 1:
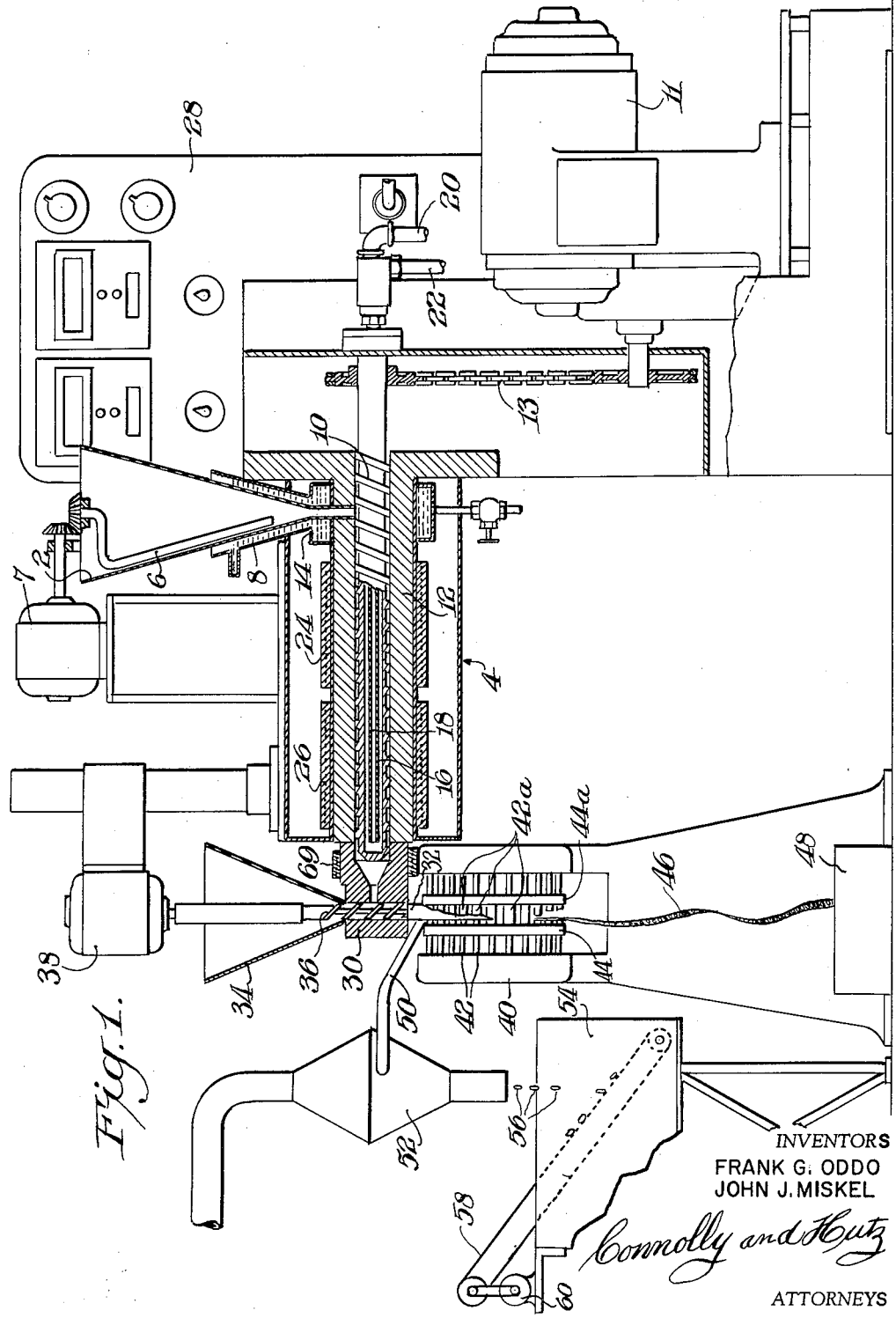
FIG. 1 is a view in elevation, schematically illustrating a machine for producing capsules in accordance with this invention.

FIGS. 26, 27 and 28 are cross-sectional views taken through FIG. 25 along the lines 26—26, 27—27 and 28—28 respectively;

FIG. 29 is a diagrammatic view of a portion of the tubing formed by the apparatus shown in FIG. 25;

FIG. 30 is a front view in elevation, partially broken away in cross-section, of a modification of the capsule-forming portion of the apparatus shown in FIG. 1; and FIG. 31 is a cross-sectional view taken through FIG. 30 along the line 31—31.

In accordance with the present invention, gelatin is first blended with an edible or pharmacologically acceptable plasticizing agent and a small proportion of water in a conventional mixer, such as a planetary mixer. The blending is preferably conducted at a temperature from about 40 to 70° F. and for a period of from about twenty minutes to about one hour, although lower temperatures may be employed if desired. It is important to maintain a blending temperature below about 70° F., since it has been found that lower temperatures favor more uniform distribution of the water on the gelatin, and thereby avoid clumps or gelatinous masses.

The gelatin employed for this purpose should preferably conform to the standards and specifications for gelatin as set forth in the Pharmacopoeia of the United States. It may be derived from a number of sources such as the skin, white connective tissues, and bones of various animals. For optimum results, it is preferred to employ gelatin having a bloom (hardness) of from about 100 to 300.

A variety of pharmacologically acceptable plasticizing agents may be blended with the gelatin to provide the capsules of this invention. For example, suitable plasticizing agents include polyhydroxy alcohols, such as glycerol, sorbitol, polyethylene glycol, propylene glycol, and the like, as well as the lower alkyl esters of hydroxy polycarboxylic acids, such as triethyl citrate, tributyl citrate, acetyl triethyl citrate, acetyl tributyl citrate, and acetyl tri-2-ethylhexyl citrate. The plasticizing agent should preferably not only plasticize the gelatin and render it more workable, but should also act as a humectant to impart and retain the proper moisture balance in the finished capsule. The particular agent selected should of course be relatively tasteless, odorless, of good color and it should be pharmacologically acceptable, i.e., capable of being ingested without adverse effect. It should also be inert with respect to the medicament which is to be incorporated into the finished capsule.

The relative proportion of the major ingredients is an important factor in achieving proper processing and product characteristics. Thus, the plasticizer is employed in an amount ranging from about 20 to 100 percent by weight of the gelatin and the water from 4 to 25 percent by weight of the gelatin. At least 4% added water is essential for adequate fusion of the gelatin composition. A preferred range of proportions is about 33 to 65 percent plasticizer and 5 to 15 percent water by weight of the gelatin, with particularly advantageous compositions being formed with about 40 percent plasticizer and 6 percent water by weight of the gelatin. In this connection, however, it should be noted that commercial grades of gelatin which may be employed in this invention, normally contain from about 8 to 12 percent water or an average water content of about 10 percent. The proportions herein set forth are based on the use of such material, i.e., gelatin having a moisture content, before blending, of about 10 percent. If gelatin having a greater or lesser moisture content is employed, the amount of water added during blending may be proportionately adjusted to conform to the proportions given. If desired, the blend of gelatin, plasticizer, and water may also contain relatively minor quantities of dye, pigment, such as titanium dioxide to render the capsule opaque, and flavoring agents.

The invention is further illustrated by the following preferred formulation, which may be blended as hereinabove set forth:

| | | |
|---|---|---|
| Gelatin | pounds | 3 |
| Glycerine | do | 1.2 |
| Water | grams | 70 |
| Dye (brown): | | |
|     Red No. 4 (FDC) | do | 3 |
|     Blue No. 1 (FDC) | do | 6 |
|     Yellow No. 5 (FDC) | do | 1 |
| Vanilla extract | cc | 2 |

The resulting blend is in the form of a uniform, sponge-like granular mass of gelatin particles which are relatively free-flowing and may be mechanically conveyed. If desired, it may be milled to an average diameter of about ⅛ to ¼ of an inch. Alternatively, the blend may be converted into the form of pellets by passing it through a pelletizing machine to obtain a more dense product, which may be more rapidly fed as hereinafter described. A machine which may be employed for this purpose is manufactured by the California Pelletizing Company. The gelatin granules resulting from the blending operation are extruded through a perforated plate and cut into small slugs or pellets which may range from about one-sixteenth to about one-quarter of an inch in diameter and in length.

An assembly view, in elevation, of a machine for producing capsules in accordance with this invention is shown in FIG. 1. The gelatin granules or pellets, as the case may be, are introduced to a hopper 2 of an extrusion stage of the machine, generally indicated at 4. Hopper 2 is provided with an agitator 6, driven by a motor 7, to maintain a uniform rate of feed, and a water-jacket 8 to cool the hopper and prevent premature softening of the gelatin passing therethrough. The gelatin is then fed from the hopper to a helical screw conveyor 10, which is housed in a central barrel 12 of the extrusion machine. The gelatin charge is here subjected to pressures of at least about 350 p.s.i. and compressed to from about ½ to ¼ and preferably about ⅓ of its original volume, for example, by increasing the root diameter of the screw from inlet to exit accordingly. Screw conveyor 10 is driven by a motor 11 linked thereto by a chain 13. A water-jacket 14 is provided about barrel 12 to maintain a cooled zone at the point of introduction of the gelatin to the conveyor 10. The temperature in this zone should be maintained below the softening point of the gelatin fed thereto, in order to facilitate the proper feeding of the gelatin by the screw conveyor 10. If the gelatin softens at this point, slippage about the screw will occur and the necessary pressure cannot be attained. In this connection, it has also been found important to cool the screw conveyor 10, which may be accomplished by providing it with a central bore 16 and a tube 18 for introducing cooling water to the interior thereof. The water is introduced through an inlet pipe 20 and, after passage through bore 16 of conveyor 10, it is exhausted through an outlet 22.

Barrel 12 is further provided with heating means 24 and 26, which are preferably electrical heating elements controlled by the central control panel 28 of the extrusion stage of the machine. These heating elements define two zones in which the temperature is progressively increased to a point slightly above the melting point of the gelatin. The gelatin is then forced under pressure in a fused state through a crosshead die, generally indicated at 30, where it is formed into a continuous tube 32, and simultaneously and continuously filled with the desired product in powder, liquid or paste form. This may be accomplished, in the case of powder or paste, by providing a hopper 34 and an auger 36 centrally located therein and driven by motor 38. Generally speaking, powders may be fed by means of an auger, paste may be fed by an auger or force fed with the aid of a pump, and liquids may be fed by means of a pump or by gravity. By filling tube 32 on a continuous basis, a much higher throughput is achieved than would be possible with an intermittent filling operation. The amount of fill employed will of course vary with a number of factors, such as the type of product employed, its density and potency, the rate of extrusion, and the dimensions of the tubing as well as the capsules to be formed therefrom.

The filled tube then progresses to a capsule forming stage comprising a rotatable, drum-like housing 40, provided with a plurality of capsule-forming punches 42 and 42a, which reciprocate axially with respect to, and during rotation of, housing 40. Punches 42 and 42a are respectively retained by a pair of die-rings 44 and 44a, which will later be described in more detail. The filled tube 32 is advanced between the punches 42 and 42a, which progressively close thereabout and in cooperation with die-ring 44, form or punch a succession of capsules from the tube. Under the preferred conditions of operation, this leaves a webbing or net 46, which may be collected beneath the capsule-forming stage of the machine in a waste box 48. It is also preferred to maintain tube 32 under slight tension, by adjusting the rotational speed of drum 40 so that the tube is advanced between punches 42 and 42a at a faster rate than it is extruded from extrusion head 30. This prevents the development of bloom in the tube 32 and results in more uniform capsules.

The capsules thus formed are then retained in one of the punches 42 or 42a by means of vacuum, until they are removed at the desired point by a vacuum pickoff tube 50 which transports them to a conical separating chamber 52, from which they drop into a collecting pan 54. The finished capsules 56 may be removed from the collecting pan 54 by a conveyor 58 driven by a motor 60. If the capsules are filled with either a liquid or a paste, they may be washed in collecting pan 54 with a bath of a suitable volatile, non-toxic solvent, such as acetone, the lower alcohols and ketones to remove any liquid or paste fill or external lubricant which may be retained on the outer surfaces thereof. A bath in pan 54 may also be employed to separate the capsules from any fine particles of gelatin which may be retained thereon or withdrawn therewith from the capsule-forming stage of the machine. The temperature of such a bath may be maintained at about 50 to 80° F. to cool the capsules. When the capsules are washed as indicated, they are preferably conveyed to a dryer where the volatile solvent may be quickly removed at room temperature, or slightly thereabove, by passing air through the mass.

If a fine or dense powder is employed in the filling operation, there may be a tendency for the fill to pack, which under some circumstances might adversely affect the shape of the finished capsule. In such event, the capsules may be removed from the collecting pan 54 and tumbled with air at room temperature or therebelow, to simultaneously cool and distribute the powder uniformly within the capsule. Generally speaking, this step is not essential if a dry granular product is employed in the filling operation.

The pressure to which the gelatin composition is subjected within the extruder barrel is important in order that adequate fusion and homogenization be achieved. At least about 350 p.s.i. must be attained by the action of the screw working against the back pressure created at the die, and pressures as high as 10,000 p.s.i. or even higher are sometimes desirable, depending upon the particular composition, plasticizer, and temperature cycle which are employed in a given instance. If a pressure of at least 350 p.s.i. is not maintained within the barrel, the individual gelatin particles may soften but will not lose their identity, and the extruded gelatin tube will be non-homogeneous. Various means are available for producing the pressure. The conveyor 10 may, for example, be provided with screw flights of continuously decreasing pitch in the direction of flow. Equally acceptable is a screw conveyor whose root diameter increases from the inlet to the outlet end of the barrel.

The temperatures employed prior to and during extrusion of the gelatin and formation of the capsules are also quite important to the successful operation of the process of this invention. For example, the temperature of the gelatin in the zone of the extruder defined by cooling jacket 14 should be maintained below the point at which the gelatin becomes tacky, say not in excess of about 120° F. The temperature in the first heating zone, defined by heating element 24, should be from about 140° to 240° F., and preferably at about 180° F. The heating zone defined by heating element 26 should be maintained at from about 150° to 260° F. and preferably at about 200–210° F. for optimum results. Thus, the temperature of the gelatin composition in the extruder is gradually increased up to about 210° F. to bring it to a molten condition. These temperatures favor the rapid production of a homogeneous melt having the desired flow characteristics, without degradation of the gelatin.

The temperature of the gelatin during extrusion, that is, at the extruder head 30, is preferably maintained slightly below the solidification temperature of the gelatin, say from about 5 to 40° below its solidification point. This may be accomplished by maintaining the temperature at about 120 to 220° F., preferably at about 200° F., by means of electrical heating elements 96 and 98 shown in FIG. 2. As the gelatin reaches the die opening it should be soft enough to pass through smoothly, but firm enough to provide the back pressure necessary for successful fluxing of the composition. The heat applied at the die prevents the formation of a surface skin on the gelatin tube and thereby maintains the gelatin in a plastic or moldable state so that it will flow and bond to itself upon the later application of pressure. However, care should be taken to avoid extrusion of the gelatin in the molten state, since the tube will distort upon leaving the extrusion die, rendering it difficult or impossible to produce a uniform capsule.

Upon leaving the extrusion die the filled gelatin tube is rapidly conveyed, with little change in temperature, to the capsule-forming stage of the machine. Thus, the temperature of the gelatin in the filled tube at this point may range from about 120° to 220° F., which maintains the gelatin in a plastic state until it engages the capsule-forming punches 42 and 42a. These punches are, for example, operated at room temperature, and their temperature, accordingly, does not usually exceed 90° F.

It should be appreciated that the temperatures employed throughout the process of this invention will vary with the composition of the gelatin blend selected and with the speed of operation, particularly the rate of extrusion and/or the retention time of the gelatin within the extruder. Normally, the gelatin is retained within the extruder for a period no longer than about 4 to 12 minutes, which permits operation at moderately high temperatures without decomposition.

Figure 2:
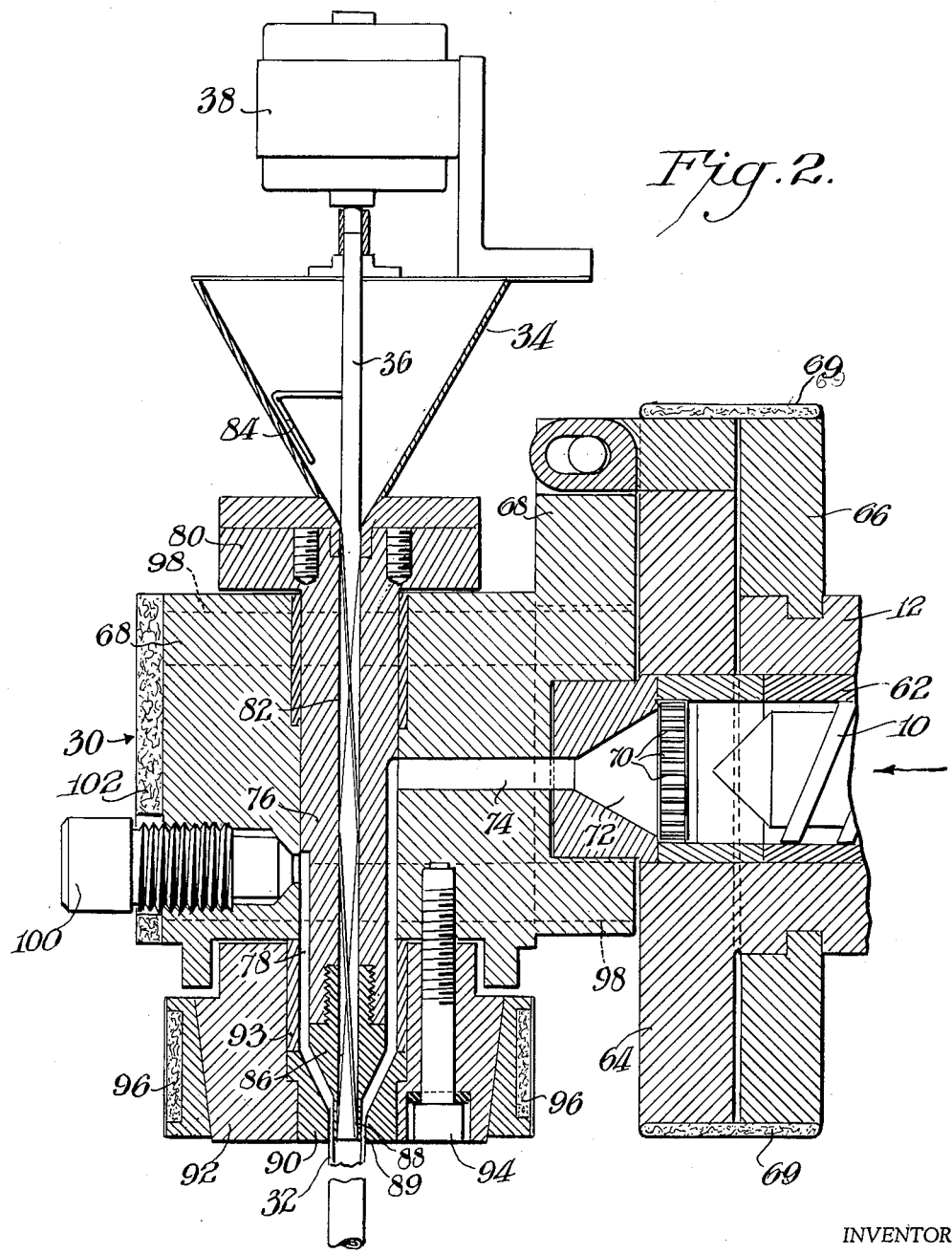
FIG. 2 is a view in elevation, in section, showing details of the extruding head and filling means employed in FIG. 1.

The extruder head is more particularly shown in FIG. 2, wherein the end of the extruder barrel 12 is shown with a cylindrical liner 62. Barrel 12 is provided with a flange 64. A split ring 66 surrounds the extruder barrel 12 for retaining an extruder head 68 which is bolted thereto. A heating element 69 surrounds both flange 64 and ring 66, maintaining the end of barrel 12 at about the same temperatures as in the zone defined by heater 26 in FIG. 1.

The end of extruder liner 62 is provided with a screen 70 to retain any lumps which may exist in the molten gelatin and assure that a uniform melt is delivered to the extrusion head 68. From the screen the molten gelatin is forced through a chamber 72 of decreasing cross-sectional area into a passage 74 of the extruder head.

The extruder head 68 is provided with a central bore which receives a mandrel 76 of stepped cylindrical configuration, defining an annular passage 78 between a portion of the mandrel and the wall of the bore. Passage 78 communicates with passage 74, which delivers gelatin from the extruder barrel. Mandrel 76 is provided with a flanged head 80, removably bolted to the head 68 for cleaning purposes. The central portion of mandrel 76 is provided with a bore 82 which receives filling auger 36. The upper portion of auger 36 within hopper 34 may be provided with an agitator 84 for assisting the filling operation as the auger is rotated by motor 38.

The base of mandrel 76 is provided with a detachable section 86, which may be threadably attached to the mandrel as shown. The mandrel is thereby gradually decreased in diameter to form a tubular terminal portion 88 through which the fill passes and over which the gelatin is extruded. A die 90 surrounds this terminal portion 88 to shape the outer wall of the gelatin tube, defining, with tubular element 88, an annular orifice 89. When extruding gelatin of the character described, it has been found that the land, or distance the gelatin travels between the cylindrical wall in the lower part of die 90 and the tubular terminal portion 88 of the mandrel, is somewhat critical. For optimum results, the land should be approximately one to two times the outer diameter of the gelatin tube which is being extruded, preferably one and one-half times the outer diameter of said tube. If the land is substantially less, the resulting tube will be too soft and tend to become bulbous upon its discharge from the extruder. If the land is substantially greater, the tube will become too firmly solidified for satisfactory extrusion or subsequent encapsulation. Moreover, it is important that the tubular section 88 of the mandrel terminate at about the terminal end wall of die 90. If it extends much beyond the terminus of die 90, the inner wall of the gelatin tube tends to adhere thereto, causing quantities of gelatin to bloom or accumulate at the annular orifice of the die.

Die 90 is retained by a ring 92 which is bolted to the extruder head 68 by several bolts, as shown at 94, and a sleeve 93 above die 90 to facilitate assembly. The outer portion of ring 92 advantageously carries a heating element 96 which may be an electrical band type header. Probe-type heating elements 98 are also provided within the extruder head 68 to further control the temperature of the head. A bleeder plug 100 is provided for removal of the first gelatin which comes through when starting up, and the outer face of head 68 may be provided with insulation 102 to assist in controlling its temperature during operation.

Figure 3:
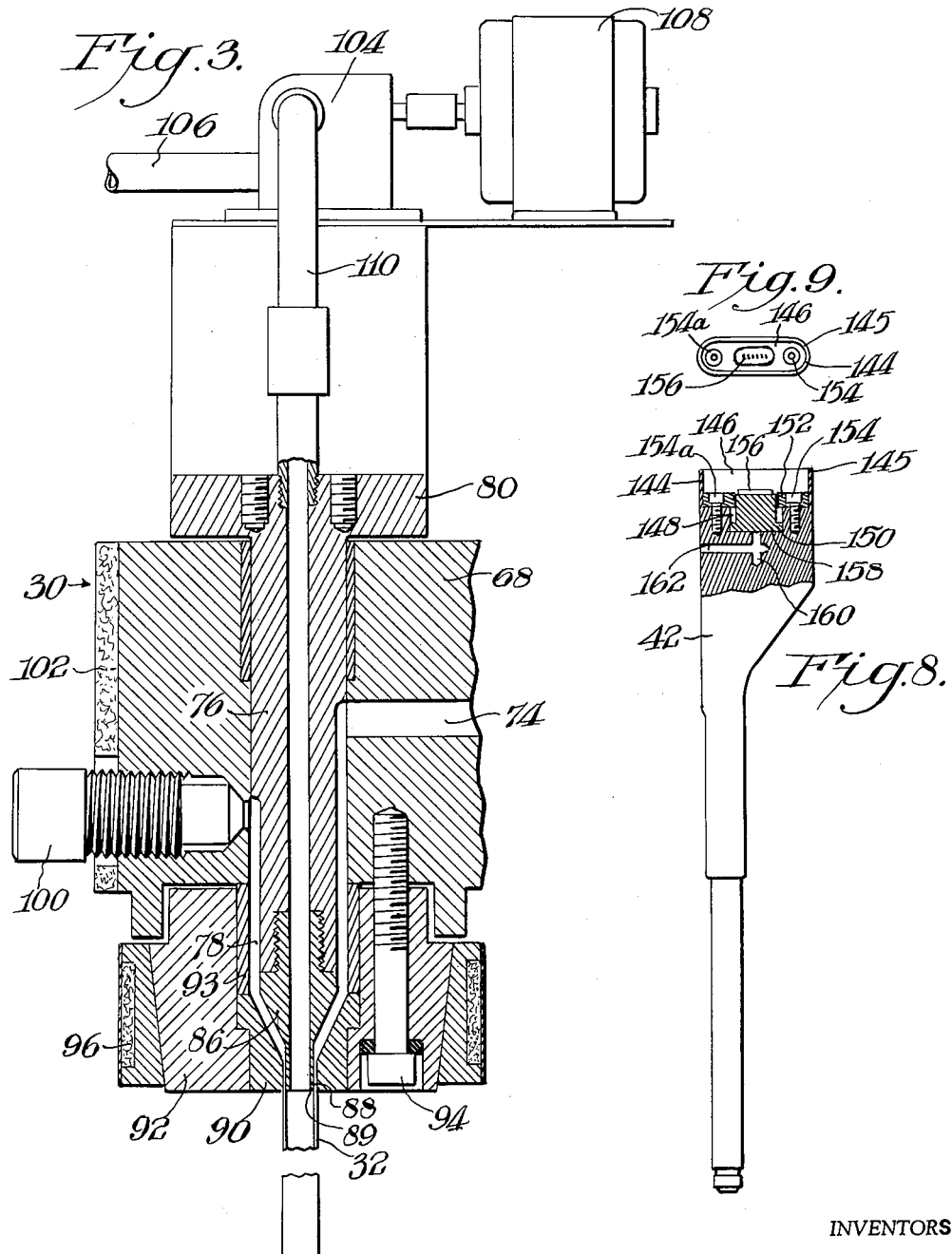
FIG. 3 is a view in elevation, in section, of the extruding head of FIG. 1 and a modified form of filling means which may be employed therewith.

When liquid or paste feeds are employed, the feeding mechanism may be modified as in FIG. 3. In this case, the auger 36 and hopper 34 are replaced by a pump 104 which receives the liquid or paste from a reservoir, not shown, connected to an inlet pipe 106. The pump is operated by a motor 108 and the liquid or paste fill is delivered from pump 104 to a pipe 110 which is connected to the head 80 of mandrel 76. As in the case of the auger feed, the pump is continuously operated during extrusion of the gelatin tubing.

Figure 4:
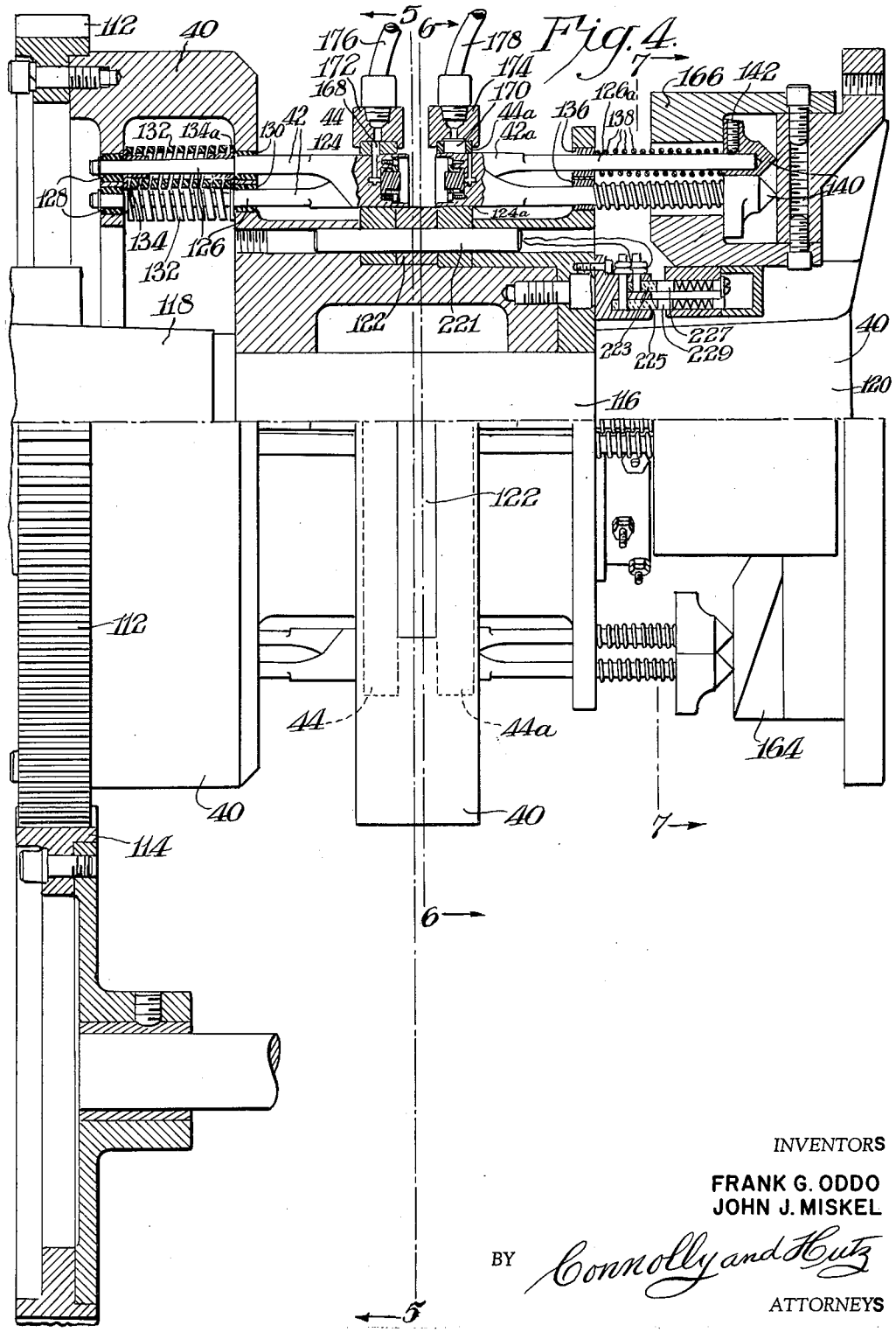
FIG. 4 is a view in elevation, partly in section, showing details of the capsule-forming mechanism of FIG. 1.
Figure 5:
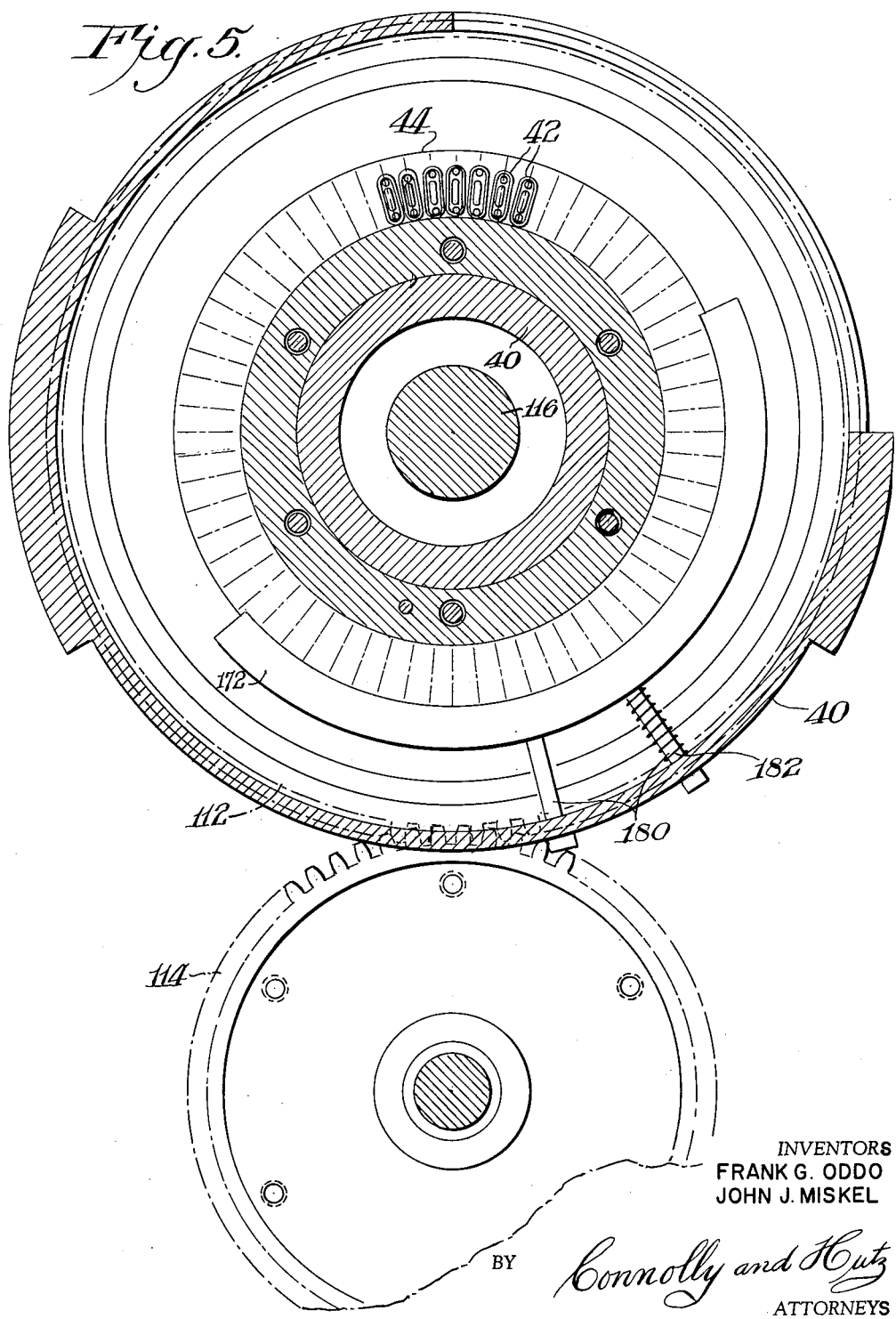
FIG. 5 is a section along line 5—5 of FIG. 4.
Figure 6:
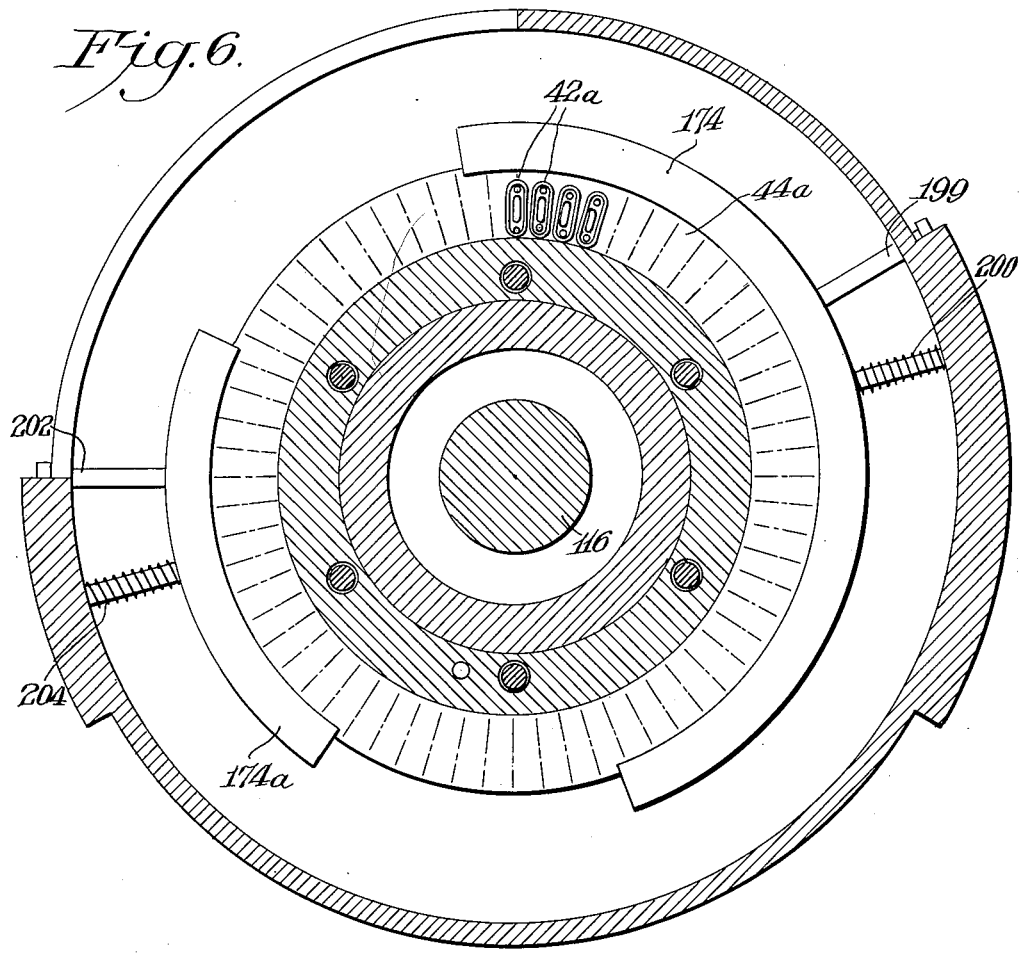
FIG. 6 is a section along line 6—6 of FIG. 4.

As stated, the extruded and filled tube is continuously advanced to an encapsulation mechanism, the details of which are shown in FIGS. 4 to 6. This mechanism is comprised of a rotatable housing 40, which is bolted to a ring gear 112 as shown and driven by a driving gear 114, which in turn is operated by a motor, not shown. Housing 40 is carried by a central shaft 116 journaled in bearings 118 and 120. Shaft 116 further carries die rings 44 and 44a, which are separated from one another by a spacer ring 122. Die ring 44 is provided with a plurality of elliptical passages 124 extending radially therethrough near its outer periphery, while die ring 44a is provided with a plurality of similar passages 124a. The passages 124 in die ring 44 are adapted to receive punches 42, which are reciprocable therewithin, and the passages 124a in die ring 44a are adapted to receive a similar set of punches 42a. Punches 42 are provided with cylindrical stems 126 which are journaled in bushings 128 and 130 of housing 40. These punches are spring-loaded by means of compression springs 132 about each of the stems 126, and the springs are maintained in alignment by bushings 134 and 134a. The bushings are free to move, and a shoulder on stem 26 acts against bushing 134a. This permits reciprocation of punches 42 within passages 124 when pressure is exerted against the capsule-forming face of the punch, and return of the punch to an inoperative position, as shown, upon release of such pressure.

Punches 42a are similarly positioned so that the stems 126a thereof are reciprocably located within bearings 136, with the body portion of the punches 42a within passages 124a. It should be noted, however, that ring 44a functions as a bearing surface for the punches rather than as a die per se. The stems 126a of punches 42a are likewise spring-loaded through springs 138 carried between bearings 136 and cam followers 140 retained on the ends of the stems. Cam followers 140 are made adjustable by means of set screws 142 so that the stroke of each punch can be controlled as desired.

The details of punches 42 and 42a are more particularly shown in FIGS. 8 and 9. The end of each punch is provided with an elliptical rim 144 having an end wall 145, the rim extending a sufficient distance from the body portion of the punch to provide a recess 146 which receives approximately one-half the thickness of the tube 32 or the capsule to be formed therefrom. A further recess 148 is provided within the body of the punch to receive a flanged plunger 150 which freely reciprocates within recess 148. Both recess 148 and plunger 150 may be elliptical as shown, or they may be cylindrical. Plunger 150 is retained within recess 148 by a plate 152, provided with a hole to receive the body portion of plunger 150, and secured to the body of punch 42 by screws 154 and 154a.

A preferred method for cutting capsules 56 from the filled tube 32 is illustrated in FIG. 16. As indicated therein, the central axis of the elliptical zone of compression 145a, formed by the end wall 145 of rim 144 is transverse with respect to the tube, thereby obtaining a greater number of capsules per unit length of extruded tube. However, the capsule-forming dies may also be positioned longitudinally with respect to the tube 32, as in FIG. 17. For optimum results, it is preferred to employ an extruded gelatin tube having a wall thickness of from about 0.012 to 0.030 inch. The land or thickness of the end wall 145 of rim 144 on punches 42 and 42a should preferably approach the thickness of the gelatin tube, but may range from about one-half to one and one-half times this thickness. Thus, the land may be approximately 0.012 to 0.030 inch in thickness. A thickness of 0.020 inch has been found to be particularly advantageous for both the tube 32 and land 145. If the land is too thick with respect to the tube, gaskets tend to form and the wall can be cut only with difficulty. On the other hand, if the land is too thin, the capsules generally will not be properly sealed. The outer periphery of the land should also preferably fall within the outer diameter of the filled tube 32, as shown in FIGS. 16 and 17, to leave a web or net which is readily removed after encapsulation.

The outer face of plunger 150 in each of punches 42 and 42a is provided with an embossing die 156, as in FIGS. 8 and 9, to impress the manufacturer's logotype or other indicia upon the side of the capsule. Plunger 150 is reciprocated within recess 148 by alternately connecting its opposed face 158 to a source of air and vacuum which is directed thereto through passages 160 and 162. To accomplish this, face 158 of plunger 150 is knurled and the outer edges of the plunger are freely reciprocable within recess 148, say with a clearance of about 0.008 inch, to permit transmission of air and application of vacuum to recess 146 and tube 32.

When the filled gelatin tube is first introduced into the capsule-forming stage of the machine, vacuum may be applied as the punches close upon the tube, thereby drawing the tube within recess 146 of each of punches 42 and 42a. However, this application of vacuum is not absolutely essential. After the punches have closed upon the tube, through action of cam followers 140 operating against a cam 164, shown in FIG. 4, air is introduced through passages 160 and 162 to activate plunger 150 and emboss the wall of the tube with the desired indicia as the capsule is being formed. During this operation, punches 42a are advanced against the side of tube 32, forcing the tube to become compressed laterally in a continuous zone defining the periphery of a capsule and thereby sealing the tube into capsule-shaped compartments. The compression is exerted through the action of the end wall 145 of rim 144 on punches 42a against the corresponding end wall of rim 144 on punches 42. The longitudinal advance of punches 42a is continued, driving the butting faces of the punches within passages 124 of die ring 44 and thereby shearing the capsule from the tube.

Figure 7:
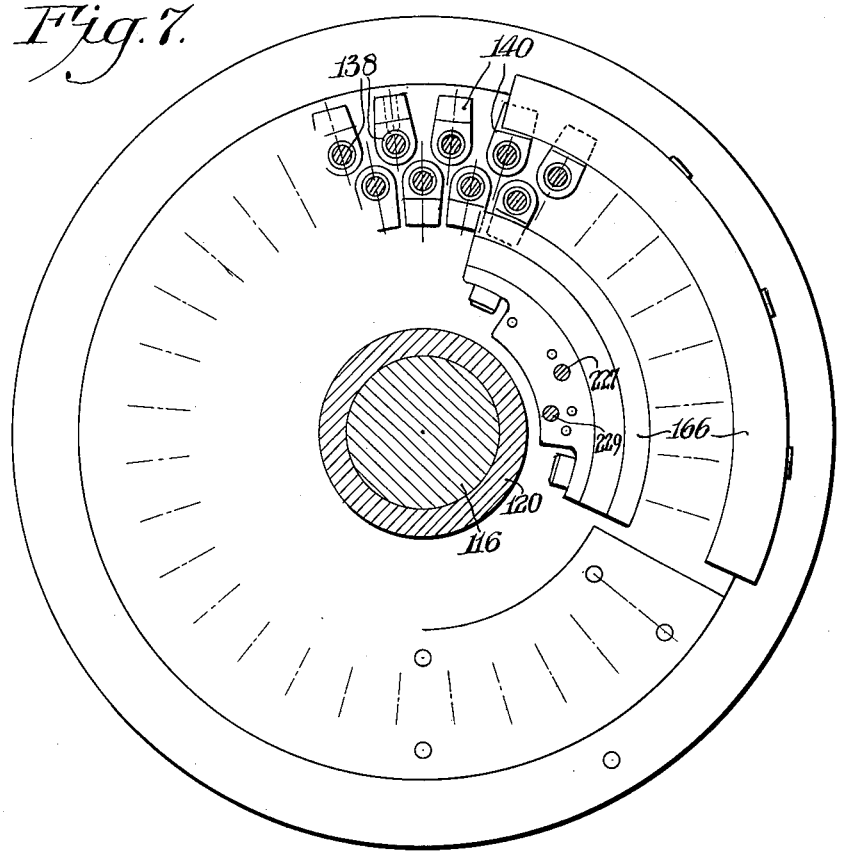
FIG. 7 is a section along line 7—7 of FIG. 4.

Upon further rotation of housing 40, cam followers 140 engage a ring cam 166, shown in FIGS. 4 and 7, which returns punches 42a to the open position. Springs 132 simultaneously return punches 42 to the position substantially as shown in FIG. 4. As the punches open, vacuum may be applied through passages 160 and 162 of one set of punches, in this case punches 42a, to retain the capsules within said punches until they progress to the desired point of discharge. However, the use of this vacuum is also not essential. At the same time, air may be directed through passages 160 and 162 of punches 42 to insure complete transfer of the capsules to punches 42a. The capsules are finally discharged from punches 42a by directing air through the same passages to unseat the capsules, at which point they are removed by vacuum pickoff tube 50 described in connection with FIG. 1.

Sources of air and vacuum are communicated to the passages of punches 42 and 42a by means of passages 168 and 170 in die-rings 44 and 44a, respectively, as shown in FIG. 4. Passages 168 are preferably in the form of cylindrical bores, while passages 170 are in the form of slots to assist in controlling the proper time sequence of operation. Also shown in FIG. 4 are a pair of shoes 172 and 174, preferably constructed of Micarta, which communicate air and vacuum with the outer peripheries of die-rings 44 and 44a. These are in turn respectively connected to tubes 176 and 178 which connect to sources of vacuum and air, not shown.

The manner in which shoes 172 and 174 control the air and vacuum cycles in the machine may best be understood by reference to FIGS. 5, 6 and 10 to 15. FIG. 5 shows the physical location of shoe 172 with respect to die-ring 44, which rotates clockwise with respect thereto. Shoe 172 is resiliently mounted on pins 180, one of which is spring loaded by means of a spring 182. The details of shoe 172 are more particularly shown in FIGS. 10 and 11, wherein 184 is a central channel adapted to receive the outer periphery of die-ring 44, which rotates freely therewithin. Channel 184 is provided with a series of longitudinal slots 186, 188 and 190 for the purpose of communicating the outer periphery of die-ring 44 with sources of air and vacuum. Slot 186 connects with a passage 192 which in turn is connected to a source of vacuum; slot 188 connects with a passage 194 which is in communication with a source of compressed air; and slot 190 connects with a passage 196 which is in communication with a source of vacuum. Holes 198 are provided in the outer periphery of shoe 172 to receive mounting pins 180.

As die-ring 44 rotates clockwise in FIG. 5, its passages 168 communicate first with slot 186, and therethrough, to a source of vacuum which assists in drawing the filled tube 32 into the face of punches 42. As passages 168 pass slot 186, the vacuum is interrupted and the punches 42 and 42a meanwhile close about tube 32. Continued rotation of ring 44 results in establishing communication between passages 168 and slot 188, which delivers compressed air to the punches, resulting in embossing of the capsule or tube by embossing plunger 150. As ring 44 passes slot 188, the air is interrupted and the punches remain closed until slot 190 is reached. At this point, air is delivered to punches 42 in order to effect complete transfer of the capsules to punches 42a, in which they are retained by vacuum until discharged.

The manner in which shoe 174 communicates air and vacum to die-ring 44a may be seen from FIGS. 6 and 12 to 15. As indicated in FIG. 6, shoe 174 is advantageously divided into two parts for ease of assembly. The main portion of the shoe 174 is retained by pins 199, one of which is spring-loaded by a spring 200. The other portion of the shoe, 174a, is similarly mounted by pins 202, one of which is also spring-loaded by means of spring 204. Both portions of the shoes 174 and 174a are provided with mounting holes 205 and 205a to receive pins 199 and 202. A central channel 206 and 206a is provided in shoe 174 and 174a to receive the outer periphery of die-ring 44a which rotates freely with respect thereto. As die-ring 44a rotates counterclockwise in FIG. 6, it engages channel 206a in shoe 174a. Rotation of the ring results in registration of slots 170 in ring 44a with a central longitudinal slot 208 in shoe 174a, which is connected to a source of vacuum through a passage 210, during which the filled tube 32 is drawn into the capsule-forming recesses of punches 42a. Thereafter, slots 170 register with a further slot 212 in shoe 174a, for the purpose of delivering compressed air from a passage 214 to the embossing plunger 150 within punches 42a. Continued rotation of die-ring 44a results in registering slots 170 with a longitudinal slot 216 in shoe 174, which communicates with a source of vacuum through a passage 218. This results in retaining the capsules within punches 42a after both sets of punches open and until such time as it is desired to discharge the capsules from the machine. Discharge of the capsules is accomplished by means of a further longitudinal slot 220, connecting through a passage 222 to a source of compressed air which unseats the capsules from the die-forming face of punches 42a to facilitate their removal by vacuum pickoff tube 50, shown in FIG. 1.

The capsule-forming stage of the machine may be provided with heaters 221, in housing 40, as in FIG. 4, to maintain punches 42 and 42a at a slightly elevated temperature. This is accomplished by providing housing 40 with commutator rings 223 and 225, connected to the heaters 221 as shown in FIG. 4, and communicating, through a pair of brushes 227 and 229 respectively, with a source of electrical power. However, in usual operation, heaters 221 are not energized, and as previously mentioned, punches 42 and 42a operate at temperatures below 90° F.

After leaving the encapsulation stage, the capsules thus formed may then be washed and/or tumbled as previously described, or packaged as described. The web or net 46, which is collected in waste box 48, may be processed to recover any fill retained thereon and it may be washed and reprocessed to form additional capsules.

A modified die for producing a compartmentalized capsule in accordance with this invention is shown in FIGS. 18 and 19. Such a capsule may be employed to encapsulate incompatible materials in two or more compartments which are separated from one another by a wall of gelatin. In this case mandrel 76 is provided with two passages 224 and 226 which communicate with sources of different medicaments, preferably in liquid or paste form which may be fed by means of a pump as shown in FIG. 3. The base of mandrel 76 is provided with a central slot 228, extending transversely therethrough and into communication with annular passage 89 between the outer wall of the mandrel and the inner wall of die 90. The gelatin, which is extruded in the manner previously described, is forced under pressure from passage 89 into slot 228, thereby forming a central partition integral with the outer walls of the tube 32 and dividing the same into two separate compartments. Upon passage of the thus extruded tube through the capsule-forming stage of the machine, as previously described, there is formed a capsule containing two different fills separated by a partition 230.

The present invention achieves substantial economies over other methods of gelatin encapsulation. In particular, it provides a high-speed encapsulation method and apparatus which is capable of producing between about 1,000 and 3,000 capsules per minute, far in excess of those obtainable with ordinary methods of encapsulation. In addition, the resulting capsules are uniform, of excellent quality, and do not require prolonged drying, since the total moisture content of the gelatin composition in the finished capsule ranges from only about ten to fifteen percent.

In FIG. 20 is shown apparatus 10c which is a modification of this invention particularly effective for manufacturing capsules filled with a powder. This apparatus includes, for example, a novel extruding head 234 which forms a length of gelatin tubing 236 having a slit 238 extending within it for a short distance from head 234 to permit air to be expelled therethrough. Head 234 also discharges a filament 240, for example, upon the side of the tube remote from slit 238 for strengthening it and helping index it during the capsule forming operation.

Apparatus 10c also includes a combined inclined guide and compression-applying means 242 for cooperating with the aforementioned extruding means to maintain the powder-filling uniform and for flattening the filled tubing to facilitate its separtion into capsules. Furthermore, the final capsule-forming stage 244 which is, for example, a rotary punching device similar to that previously described in FIGS. 4–14 is inclined in line with inclined guide means 242 to cooperate therewith in producing uniform powder-filled capsules. Details of modification 10c are described in the following.

In FIGS. 20 and 25–28 are shown details of extrusion means 234 which includes a cylindrical orifice 246 having a relatively thin rib 252 extending into the annular orifice 248 between cylindrical orifice 246 and hollow mandrel 250 to form a slit in the tube as it is being formed for permitting entrapped air to be expelled from within the tube. When annular orifice 248 is, for example, approximately ¾ of an inch in diameter and about 0.03 inch in radial dimension, rib 252 is, for example, ⅛ inch wide and is retained in a similar fashion to shaft key. This provides an extruded gelatin tube as shown in FIG. 26 having a space approximately ⅛ inch wide between the separated ends of its wall as it is being formed. Because of the tacky nature of the extruded gelatin, the tube automatically reseals itself promptly after a relatively short distance of travel from extrusion means 234 to provide a fully sealed tube as shown in FIGS. 26–27.

Orifice 246 also includes a port 254 outside of space 248 which extrudes a filament 240 of gelatin which attaches itself to the outside of the tube by virtue of its inward inclination for strengthening the wall and helping index it during the capsule-separating operation which cuts off capsules in the configuration shown in FIG. 29.

After slit 238 closes and filament 240 attaches to gelatin tube 236, tube 236 falls upon inclined guide and compression means 242 which includes a conveyor means 256 which is, for example, an endless belt made of a slippery material such as polytetrafluoroethylene, known as Teflon, for preventing undue adherence of the tacky gelatin tubing thereto. Conveyor belt 256 rotates in the direction of arrows 258 to support powder-filled tube 236; and, in cooperation with compression roller 260 and slit 238, consistent quantities of powder are caused to be deposited uniformly within tubing 236. Unless this air is removed, it seriously interferes with the uniformity of powder filling. Furthermore, the support provided by belt 256 prevents the tubing from stretching and deforming under the weight of the powder.

Compression roller 260 which is, for example, made of steel, is rotatably mounted upon suitable bearings 262 with its surface disposed, for example, a distance away from the surface of belt 256, which distance is about half the original thickness of gelatin tube 236. This compresses the tube to one-half its original thickness thereby flattening it to facilitate capsule-forming and expelling any entrapped air through slit 238, thereby providing uniformly filled lengths of tubing. Roller 260 is, for example, internally cooled by water flow to prevent the gelatin tube from sticking to it, and this sticking is further inhibited by a lubricating fluid, for example, mineral oil which is supplied through conduit 264 which, for example, drops this mineral oil upon the surface of compression roller 260. A rubber inking roller 266 is mounted in contact with the surface of roller 260 in conjunction with backing roller 268. Ink bath 270 provides a supply of pigmented fluid in which backing roller 268 rotates to pick up ink and transfer it through roller 266 to roller 260 for permitting compression roller 260 to color one side of gelatin tube 236 as it compresses it, when such coloration is desirable for the sake of attractive appearance or identification.

A dead plate 272 including a thin flat extension 273 is provided at the exit from conveyor belt 256 for smoothly guiding tube 236 away from it and into capsule-forming stage 244. Dead plate 272 is also made of a slippery material such as Teflon, and lubricating means 274 including oil ports 276 supplied with lubricating fluid through conduit 278 prevents the tube from sticking to this dead plate. In FIG. 24 are shown details of the laterally inclined guide means 242 which facilitate its adjustment to provide optimum operation.

Capsule-forming stage 244, including rotary housings 280 and 282 and punches 284 and 286, rotates as previously described in the direction of movement of tube 236. Rotary housings 280 and 282 rotate, for example, to provide a tangential speed slightly greater than the speed of movement of conveyor belt 256 to provide a slight pull upon the filled tube keeping it aligned in a straight line and thereby facilitating accurate cutting.

In FIG. 30 is shown a highly efficient punch element 288 which provides capsules having particularly smooth outer surfaces. Punch 288 is similar in most respects to the punch shown in FIG. 8 with the exception that its 0.020 inch thick outer wall 290 is beveled to provide a relatively sharp land 292 ranging in thickness from 0.004 to 0.006 inch. This sharp outwardly tapering inner wall 294 effectively drives any parting seam formed about the outer surface of the capsule within the interior thereby providing capsules having remarkably smooth outer surfaces without any external flashing.

What is claimed is:

1. An apparatus for producing filled capsules comprising means for continuously extruding a tube of gelatin-containing material including an extrusion die provided with a cylindrical orifice and a hollow cylindrical mandrel extending within said die and terminating at about the end wall thereof, means for continuously delivering through said mandrel and into said tube a substance to be encapsulated, a rotatable cylindrical housing provided with a plurality of opposed sets of capsule-forming punches near the outer periphery thereof and axially reciprocable upon rotation of said housing to compress successive lengths of said tube between successive sets of punches thereby forming capsules therefrom, means for rotating said housing, and means for progressively closing and opening said opposed sets of punches during rotation of said housing.

2. An apparatus for producing filled capsules comprising means for continuously extruding a tube of gelatin-containing material including an extrusion die provided with a cylindrical orifice and a hollow cylindrical mandrel extending within said die and terminating at about the end wall thereof, the land of the annular zone defined by said orifice and the outer wall of said mandrel being from about one to two times the diameter of said orifice, means for continuously delivering through said mandrel and into said tube a substance to be encapsulated, a rotatable cylindrical housing provided with a plurality of opposed sets of capsule-forming punches near the outer periphery thereof and axially reciprocable upon rotation of said housing to compress successive lengths of said tube between successive sets of punches thereby forming capsules therefrom, means for rotating said housing, and means for progressively closing and opening said opposed sets of punches during rotation of said housing.

3. An apparatus for producing filled capsules comprising means for continuously extruding and concentrically filling a tube of gelatin-containing material with a substance to be encapsulated, a rotatable cylindrical housing provided with a plurality of opposed sets of capsule-forming punches near the outer periphery thereof and axially reciprocable upon rotation of said housing to compress successive lengths of said extruded tube between successive sets of punches, each of said punches being provided with a capsule-forming rim, a plate rotatable with said housing and provided with holes adapted to reciprocably receive abutting rims of said opposed sets of punches for shearing capsules from said tube, means for rotating said housing and plate, and means for progressively closing and opening opposed sets of said punches during rotation of said housing and plate.

4. An apparatus for producing filled capsules comprising means for continuously extruding and concentrically filling a tube of gelatin-containing material with a substance to be encapsulated, a rotatable cylindrical housing provided with a plurality of opposed sets of capsule-forming punches near the outer periphery thereof and axially reciprocable upon rotation of said housing to compress successive lengths of said tube between successive sets of punches, each of said punches having a capsule-forming rim of a width from about one-half to one and one-half times the wall thickness of said extruded tube, a plate rotatable with said housing and provided with holes adapted to reciprocably receive abutting rims of said opposed sets of punches for shearing capsules from said tube, means for rotating said housing and plate, and means for progressively closing and opening said opposed sets of punches during rotation of said housing and plate.

5. An apparatus for producing filled capsules comprising means for continuously extruding a tube of gelatin-containing material including an extrusion die provided with a cylindrical orifice, a hollow cylindrical mandrel extending within said die and terminating at about the end wall thereof, means for continuously delivering through said mandrel and into said tube a substance to be encapsulated, a rotatable cylindrical housing provided with a plurality of opposed sets of capsule-forming punches near the outer periphery thereof and axially reciprocable upon rotation of said housing to compress successive lengths of said tube between successive sets of punches, each of said punches having a capsule-forming rim, a plate rotatable with said housing and provided with holes adapted to reciprocably receive abutting rims of said opposed sets of punches for shearing capsules from said tube, means for rotating said housing and plate, and means for progressively closing and opening said opposed sets of punches during rotation of said housing and plate.

6. In an apparatus for producing capsules from a continuous length of filled gelatin tubing, a pair of rotatable plates each of which is provided with a plurality of axial holes extending therethrough and radial passages connecting said holes with the outer periphery thereof, a plurality of opposed sets of capsule-forming punches reciprocably carried within the axial holes of said plates, each of said punches being provided with a capsule-forming rim, a reciprocable plunger recessed within the face defined by said rim, a passage communicating the inside end wall of said plunger with an outside wall of said punch, the last said passage being communicable with a radial passage in the plate carrying said punch, and a shoe cooperating with the outer periphery of each plate and provided with longitudinal slots for communicating said radial passages in said plate with sources of air and vacuum.

7. An apparatus in accordance with claim 6 wherein said plungers are provided with a knurled inside face permitting the passage of air thereabout and embossing means on the outer face extending within said capsule-forming rim, and wherein the slots in said shoes are arranged to alternately apply air and vacuum to said punches upon rotation of said plates thereby drawing said extruded tube within said punches through application of air when said punches are closed, thereby retaining each capsule in one of said punches through application of vacuum as said punches open and ejecting capsules from said punches through application of air.

8. In an apparatus for producing capsules, means for continuously extruding a tube of gelatin-containing material including an extrusion die provided with a cylindrical orifice, a cylindrical mandrel extending within said die and terminating at about the end wall thereof to form with said cylindrical die an annular extrusion zone, said mandrel being provided with a transverse slot communicating with said annular extrusion zone and extending to the end wall of said mandrel, a longitudinal passage on each side of said slot extending from said end wall and communicating with different sources of substances to be encapsulated, means for continuously delivering through each of said longitudinal passages a substance to be encapsulated, and means to compress said filled tube into a succession of capsules provided with an integral wall separating the different substances delivered to said tube.

9. An apparatus for producing capsules containing a powder enclosed within a casing of a gelatin-containing material comprising pressure-applying extruder means for forming a tube of said gelatin-containing material, heat exchange means associated with said extruder means for maintaining the material within it under predetermined temperature conditions, an extrusion die having an annular orifice connected to said extruder means, a hollow cylindrical mandrel extending through said die, supply means associated with said mandrel for delivering said powder through said mandrel and into said tube as it is being formed, opposed reciprocating capsule-forming elements disposed in the path of travel of said tube from said extruder means for compressing successive lengths of said tube passing between them into separate capsules, a separating rib disposed with said annular orifice for forming a slit in said extruded tubing permitting air entrapped within said powder to be expelled from within said tube as it is being formed, and said rib being thin enough to permit the separated walls of said tube to promptly contact each other a predetermined distance from said orifice to seal said slit in said tube.

10. An apparatus as set forth in claim 9 wherein a port is provided in said mandrel outside of said annular orifice for extruding a filament of the material forming said tube, and said port being directed toward the path of travel of said tube to cause said filament to adhere to the outside of said tube for strengthening it and facilitating indexing for cutting.

11. An apparatus as set forth in claim 9 wherein compression means is provided in the path of travel of said tube between said extruder and said opposed reciprocating capsule-forming elements for squeezing said tube to expel air through said slit and to flatten said tube for facilitating its separation by said opposed reciprocating capsule-forming means.

12. An apparatus as set forth in claim 11 wherein said compression means includes a conveyor element disposed at a substantial angle from the vertical for supporting said tube thereon as it is being compressed to facilitate its filling with uniform amounts of said powder and to prevent the wall of said tube from stretching and deforming.

13. An apparatus as set forth in claim 12 wherein said conveyor means includes an endless belt conveyor longitudinally disposed approximately at an angle of 45°, and a roller is mounted a predetermined distance away from said tube-conveying side of said conveyor means for compressing said tube against said conveyor means to a fraction of its original width.

14. An apparatus as set forth in claim 13 wherein said endless belt is made of polytetrafluoroethylene, said opposed reciprocating capsule-forming elements are mounted upon rotatable housings which rotate to carry successive sets of said opposed reciprocating elements into contact with said tube, and said endless belt has a linear speed slightly slower than the tangential speed of said opposed reciprocating capsule-forming elements to cause said belt to exert a slight drag upon said tube against the pull of said capsule-forming elements.

15. An apparatus as set forth in claim 14 wherein a lubricating fluid is applied to said tube upon said conveyor to prevent it from sticking to said conveyor or said compression roller.

16. An apparatus as set forth in claim 14 wherein a pigmenting means is associated with said compression roller for permitting said roller to color said tube as it compresses it.

References Cited in the file of this patent

UNITED STATES PATENTS

| | | |
|---|---|---|
| 1,628,333 | Schaub | May 10, 1927 |
| 2,205,837 | Ravenscroft et al. | June 25, 1940 |
| 2,318,718 | Scherer | May 11, 1943 |
| 2,428,911 | Gunnell | Oct. 14, 1947 |
| 2,449,139 | Power | Sept. 14, 1948 |
| 2,531,986 | Pile et al. | Nov. 28, 1950 |
| 2,720,463 | Stirn | Oct. 11, 1955 |
| 2,776,220 | Reed et al. | Jan. 1, 1957 |